(12) United States Patent
Sugaya (10) Patent No.: US 10,810,867 B2
(45) Date of Patent: Oct. 20, 2020

(54) REMOTE CONTROL SYSTEM, REMOTE CONTROL METHOD, AND PROGRAM

(71) Applicant: OPTiM Corporation, Saga-shi (JP)

(72) Inventor: Shunji Sugaya, Tokyo (JP)

(73) Assignee: OPTIM CORPORATION, Saga-Shi (JP)

(*) Notice: Subject to any disclaimer, the term of this patent is extended or adjusted under 35 U.S.C. 154(b) by 35 days.

(21) Appl. No.: 16/338,555

(22) PCT Filed: Oct. 11, 2016

(86) PCT No.: PCT/JP2016/080041
§ 371 (c)(1),
(2) Date: Apr. 1, 2019

(87) PCT Pub. No.: WO2018/069952
PCT Pub. Date: Apr. 19, 2018

(65) Prior Publication Data
US 2019/0266887 A1 Aug. 29, 2019

(51) Int. Cl.
*G08C 17/02* (2006.01)
*G06F 3/01* (2006.01)
*G06K 9/00* (2006.01)
*H04Q 9/00* (2006.01)

(52) U.S. Cl.
CPC .............. *G08C 17/02* (2013.01); *G06F 3/011* (2013.01); *G06K 9/00671* (2013.01); *H04Q 9/00* (2013.01); *G08C 2201/34* (2013.01); *G08C 2201/70* (2013.01); *G08C 2201/92* (2013.01)

(58) Field of Classification Search
CPC ................ G08C 17/02; G08C 2201/34; G08C 2201/70; G08C 2201/92; G06F 3/011; G06K 9/00671
See application file for complete search history.

(56) References Cited

U.S. PATENT DOCUMENTS

| | | | |
|---|---|---|---|
| 8,995,981 B1* | 3/2015 | Aginsky | G08C 17/02 455/419 |
| 2004/0121725 A1* | 6/2004 | Matsui | G08C 17/02 455/3.06 |
| 2009/0015433 A1* | 1/2009 | James | G08C 17/02 340/12.22 |
| 2012/0019674 A1 | 1/2012 | Ohnishi et al. | |
| 2012/0299709 A1 | 11/2012 | Nishimura | |
| 2013/0038692 A1* | 2/2013 | Ohtomo | G05D 1/0016 348/46 |

(Continued)

FOREIGN PATENT DOCUMENTS

| | | |
|---|---|---|
| JP | 2004-007106 | 1/2004 |
| JP | 2012-249104 | 12/2012 |

(Continued)

*Primary Examiner* — Brian A Zimmerman
*Assistant Examiner* — Kevin Lau
(74) *Attorney, Agent, or Firm* — Lex IP Meister, PLLC (57) ABSTRACT

A remote control system 1 includes a selecting unit 13 that selects at least one control target device from among a plurality of control target devices 2, according to a result obtained by capturing a field of view of a user by a user terminal 20, and a control unit 14 that controls the control target device 2 selected by the selecting unit 13. Accordingly, the burden on the user when selecting the control target device 2 can be reduced.

11 Claims, 9 Drawing Sheets

(56) References Cited

U.S. PATENT DOCUMENTS

| | | | |
|---|---|---|---|
| 2014/0156030 A1 | 6/2014 | Okamoto et al. | |
| 2015/0168725 A1* | 6/2015 | Kimura | G02B 27/017 345/156 |
| 2016/0054971 A1* | 2/2016 | Yu | H04N 7/15 345/2.1 |

FOREIGN PATENT DOCUMENTS

| | | |
|---|---|---|
| JP | 2014-110517 | 6/2014 |
| JP | 2015-115861 | 6/2015 |
| JP | 2016-144065 | 8/2016 |
| JP | 2016144065 A * | 8/2016 |
| JP | 2016-171402 | 9/2016 |
| WO | 2011/065028 | 6/2011 |

* cited by examiner

| Device Identifier | Position Information | | Communication Address |
| --- | --- | --- | --- |
| | Latitude/longitude | Height | |
| 000001 | N35.52480 E135.01582 | 10m | AD000001 |
| 000002 | N35.52481 E135.01582 | 3m | AD000002 |
| 000003 | N35.52481 E135.01582 | 0m | AD000003 |
| 000004 | N35.52481 E135.01582 | 1m | AD000004 |
| 000005 | N35.52481 E135.01582 | 2m | AD000005 |
| 000005 | N35.52481 E135.01582 | 5m | AD000006 |
| ... | ... | ... | ... |

REMOTE CONTROL SYSTEM, REMOTE CONTROL METHOD, AND PROGRAM

TECHNICAL FIELD

The present invention relates to a remote control system, a remote control method, and a program.

BACKGROUND ART

As a technique for remotely controlling a device, for example, there is known in the art the method disclosed in Patent Document 1. In this method, a remote controller 1 includes a network communication unit 13 that communicates with a smartphone 2, an infrared LED 117 that transmits a remote control code for operating a lighting 3 or an air conditioner 4, a storage unit 16 that stores each remote control information with which identification information indicating a type of a remote operation and a remote control code for realizing the remote operation are associated, and a central control IC 121 that transmits the remote control code corresponding to the type of the remote operation from the infrared LED 117 if receiving operation instruction information including the identification information indicating the type of the remote operation.

PRIOR ART DOCUMENT

Patent Document

Patent Document 1: Japanese Patent Application Publication No. 2015-115861

SUMMARY OF THE INVENTION

Technical Problem

Use of the technique disclosed in Patent Document 1 requires a user's operation for selecting a desired device from among options, i.e., a group of devices, in order to select a device to be controlled. As a result, the operation becomes cumbersome. On the other hand, the present invention provides a method for reducing the burden on the user who selects the device to be controlled.

Technical Solution

The present invention provides a remote control system including a selecting unit that selects at least one control target device from among a plurality of control target devices, according to a result obtained by capturing a field of view of a user by a user terminal, and a control unit that controls the control target device selected by the selecting unit.

The selecting unit may select the control target device included in an image captured by the user terminal.

The selecting unit may select the control target device based on an identification image of the control target device included in an image captured by the user terminal.

When a plurality of control target devices are included in an image captured by the user terminal, the selecting unit may select at least one control target device according to a position of each of the control target devices in the image The selecting unit may select a control target device that is not included in an image captured by the user terminal but exists in an image-capturing direction of the user terminal The remote control system may further include a display unit that includes a transmissive display panel and displays an image for guiding a control on the control target device at a position corresponding to the control target device that is seen through the display panel by the user The remote control system may further include a storage unit that stores a control history of the control target device by the control unit.

The control unit may restrict a control on the selected control target device based on a predetermined condition.

When the selecting unit selects the one control target device according to results captured by a plurality of user terminals and a control by the control unit conflicts among the plurality of user terminals, the control unit may perform a reservation process that first executes a control according to an instruction by any one of the user terminals is executed and then executes a control according to an instruction by other user terminal.

The control unit may terminate a control on the control target device based on a predetermined condition.

The user terminal may be a wearable terminal worn on a head of the user, and the control unit may be provided in an operation terminal different from the wearable terminal Further, the present invention provides a remote control method including a selecting step of selecting at least one control target device from among a plurality of control target devices, according to a result obtained by capturing a field of view of a user by a user terminal, and a control step of controlling the control target device selected in the selecting step.

Furthermore, the present invention provides a program for causing one or more computers to execute a selecting step of selecting at least one control target device from among a plurality of control target devices, according to a result obtained by capturing a field of view of a user by a user terminal, and a control step of controlling the control target device selected in the selecting step.

Effects of the Invention

According to the present invention, it is possible to support selecting an image which a user wishes to view.

DESCRIPTION OF REFERENCE NUMBERS

1: remote control system, 2, 2A, 2B: control target device, 10: server, 12: storage unit, 13: selecting unit, 14: control unit, 20: user terminal, 21: accepting unit, 22: requesting unit, 23: receiving unit, 24: display unit, 25: image-capturing unit, 90: network, 101: CPU, 102: RAM, 103: ROM, 104: auxiliary storage device, 105: communication IF, 201: CPU, 202: RAM, 203: ROM, 204: auxiliary storage device, 205: communication IF, 206: input device, 207: display device, 2071: display panel, 2072: projection device, 208: sensor, 209: camera, U: user, A: field view.

DETAILED DESCRIPTION OF THE EMBODIMENTS

1. Configuration

Figure 1:
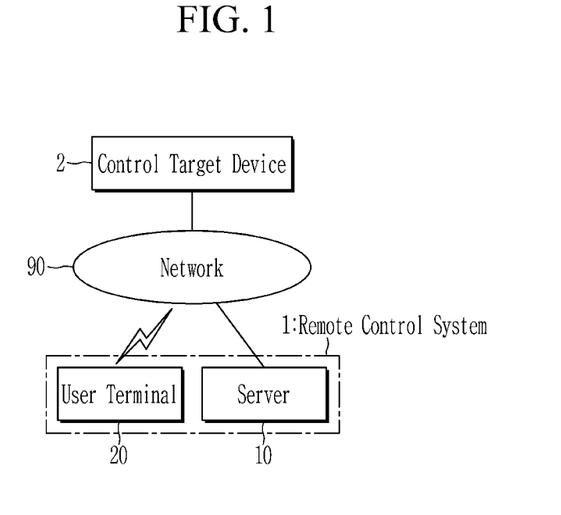
FIG. 1 is a diagram exemplifying an overview of a remote control system 1 according to an embodiment.

FIG. 1 is a diagram exemplifying an overview of a remote control system 1 according to an embodiment of the present invention. The remote control system 1 selects a control target device 2 within a range of a user's field of view from among control target devices 2 arranged in various places, and remotely controls the selected control target device 2 in accordance with a user's operation from a user terminal 20. The user terminal 20 may be realized by a single device or may be realized by a set of a plurality of devices, but the user terminal 20 includes at least a device for capturing the range of the user's field of view (for example, a glasses-type wearable terminal that can be worn by the user as a head set). The control target device 2 situated in a direction toward a face of the user wearing the user terminal 20 is selected as the control target device 2 within the range of the user's field of view. As a result, the user readily looks at the control target device 2 that the user wishes to operate, thereby enabling the user to remotely control the control target device 2.

As shown in FIG. 1, the remote control system 1 is connected to a plurality of control target devices 2 via a network 90. The control target devices 2 are devices which can be controlled remotely (that is, controlled without the user's direct touch on the control target device 2). Each of the control target devices 2 is, for example, a machine tool installed in a factory or the like, a surveillance camera installed indoors or outdoors, a home electric appliance located in an office or house, or the like. These devices are merely examples, and any device can be used. The network 90 can be any network as long as it servers to connect the control target devices 2, a server 10, and the user terminal 20. The network 90 is, for example, the Internet, a LAN (Local Area Network), a WAN (Wide Area Network), or a combination thereof, and may include a wired section or a wireless section.

The remote control system 1 includes the server 10 and the user terminal 20. The server 10 selects the control target device 2 within the range of the user's field of view from among the plurality of control target devices 2 and remotely controls the selected control target device 2 from the user terminal 20 according to the user's operation. The user terminal 20 is a device that functions as a client of the remote control system 1, and receives various instructions from the user, captures an image of a space corresponding to the user's field of view, and displays guidance on remote control for the user.

Figure 2:
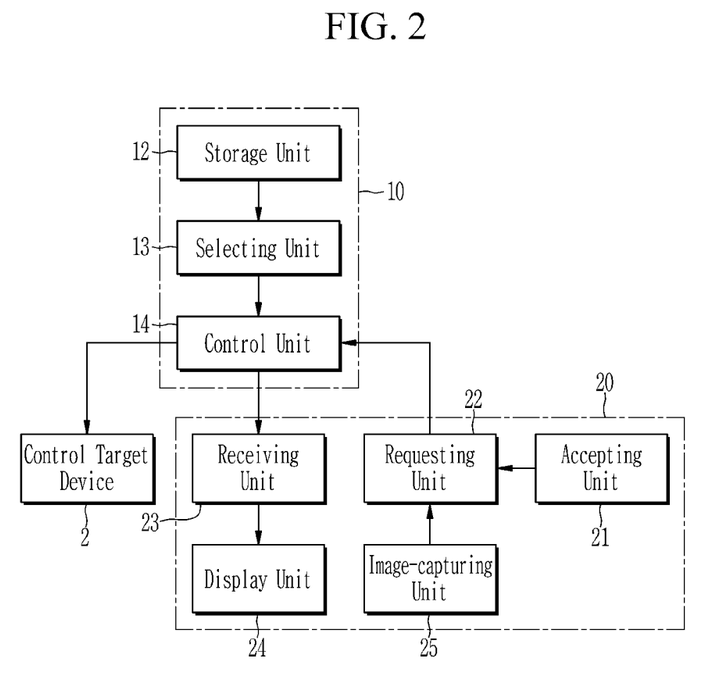
FIG. 2 is a diagram exemplifying a functional configuration of a remote control system 1.

FIG. 2 is a diagram exemplifying a functional configuration of a remote control system 1. The remote control system 1 includes a storage unit 12, a selecting unit 13, a control unit 14, an accepting unit 21, a requesting unit 22, a receiving unit 23, a display unit 24, and an image-capturing unit 25. In this example, in the remote control system 1, an image-acquiring unit 11, the storage unit 12, the selecting unit 13, and the control unit 14 are implemented in the server 10, and the accepting unit 21, the requesting unit 22, the receiving unit 23, the display unit 24, and the image-capturing unit 25 are implemented to the user terminal 20.

The accepting unit 21 accepts an instruction for requesting a remote control from the user. The image-capturing unit 25 captures an image of a space corresponding to the user's field of view. In response to the instruction accepted by the accepting unit 21, the requesting unit 22 transmits to the server 10 a request for selection of a control target device to be remotely controlled. The request for selection includes information (a captured image in this case) corresponding to a result captured by the image-capturing unit 25. The selecting unit 13 selects at least one control target device from among a plurality of control target devices 2 in accordance with a result obtained by capturing the user's field of view by the user terminal 20. More specifically, the selecting unit 13 selects a control target device 2 included in the captured image captured by the user terminal 20. The storage unit 12 stores information used for the selection. The control unit 14 transmits to the user terminal display data for displaying guidance when the user remotely controls the control target device 2 selected by the selecting unit 13, or the control unit 14 remotely controls the control target device selected by the selecting unit 13. The receiving unit 23 receives the display data provided by the control unit 14. The display unit 24 displays the display data received by the receiving unit 23 on the user terminal 20.

Figure 3:
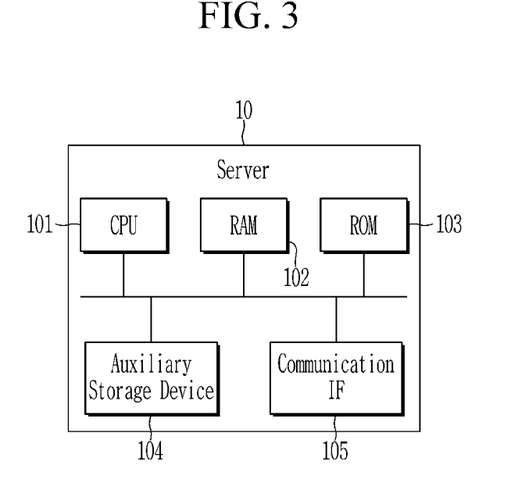
FIG. 3 is a diagram exemplifying a hardware configuration of a server 10.

FIG. 3 is a diagram exemplifying a hardware configuration of a server 10. The server 10 is a computer device including a CPU (Central Processing Unit) 101, a RAM (Random Access Memory) 102, a ROM (Read Only Memory) 103, an auxiliary storage device 104, and a communication IF 105. The CPU 101 is a processor that performs various operations. The RAM 102 is a volatile memory that functions as a work area when the CPU 101 executes a program. The ROM 103 is, for example, a nonvolatile memory that stores a program and data used for starting the server 10. The auxiliary storage device 104 is a nonvolatile storage device that stores various programs and data, and includes, for example, an HDD (Hard Disk Drive) and an SSD (Solid State Drive). The communication IF 105 is an interface that performs communication via the network 90 in accordance with a predetermined communication standard.

In this example, the auxiliary storage device 104 stores a program (hereinafter referred to as "server program") that causes the computer device to function as a server in the remote control system 1. The CPU 101 executes the server program thereby implementing functions shown in FIG. 2. The CPU 101 executing the server program is an example of the selecting unit 13 and the providing unit 14. The auxiliary storage device 104 is an example of the storage device 12.

Figure 4:
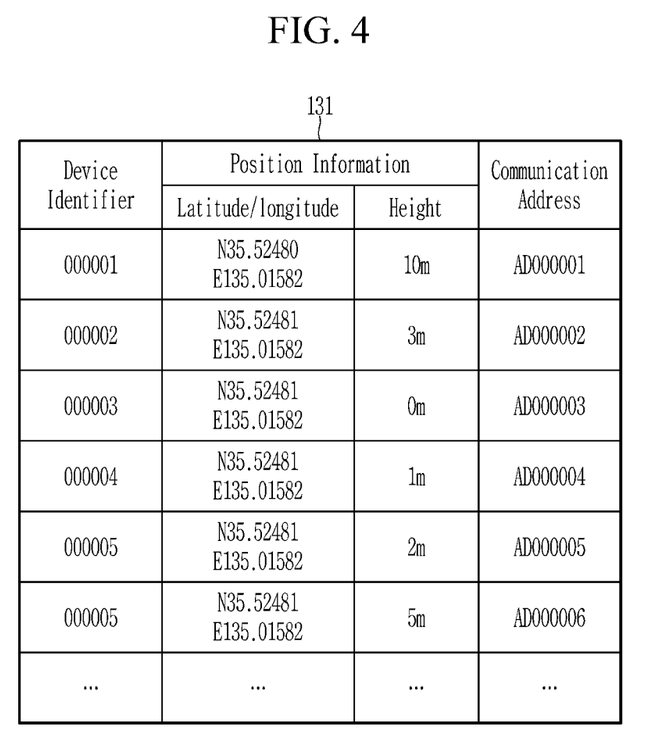
FIG. 4 is a diagram exemplifying information stored in a storage unit 12.

FIG. 4 is a diagram exemplifying information stored in a storage unit 12. The storage unit 12 stores a device identifier, position information, and a communication address in association with each other. The device identifier is information for identifying a control target device 2. The device identifier is attached to a casing or the like of each control target device in a state encoded into a two-dimensional bar code or the like. The position information is information indicating an installation position of the control target device 2. In the example shown in FIG. 4, the position information includes latitude and longitude of the position of the control target device 2, and a height (height from the ground) of the control target device 2. The communication address is a communication address (for example, MAC address or the like) in the network 90 of each control target device 2, and is used when the server 10 remotely controls each control target device 2.

Figure 5:
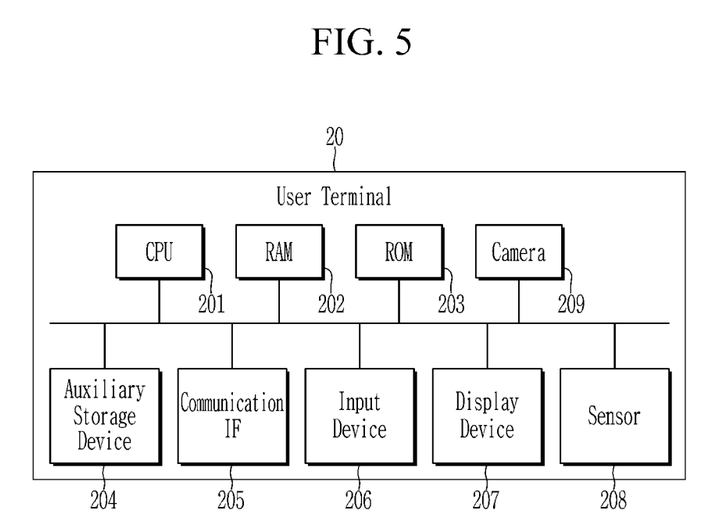
FIG. 5 is a diagram exemplifying a hardware configuration of a user terminal 20.

FIG. 5 is a diagram exemplifying a hardware configuration of a user terminal 20. As described above, the user terminal 20 may be realized by a single device, or may be realized by a set of a plurality of devices. Here, for example, the user terminal 20 is described as an example that is realized by a glasses-type wearable terminal that can be worn by the user as a head set and is the single device.

The user terminal 20 is a computer device including a CPU 201, a RAM 202, a ROM 203, an auxiliary storage device 204, a communication IF 205, an input device 206, a display device 207, a sensor device 208, and a camera 209. The CPU 201 is a processor that performs various operations. The RAM 202 is a volatile memory that functions as a work area when the CPU 201 executes a program. The ROM 203 is, for example, a nonvolatile memory that stores a program and data used for starting the user terminal 20. The auxiliary storage device 204 is a nonvolatile storage device that stores various programs and data, and includes at least one of, for example, an HDD and an SSD. The communication IF 205 is an interface that performs communication via the network 90 in accordance with a predetermined communication standard. The communication standard may be a wireless communication standard or a wired communication standard. The input device 206 is a device for input by a user of an instruction and information to the CPU 201, and includes, for example, at least one of a touch sensor, a key, a button, and a microphone. The display device 207 is a device that displays information, and includes, for example, an LCD (Liquid Crystal Display). The sensor 208 is a means for sensing a position of the user terminal 20 and an orientation of a face of a user wearing the user terminal 30, and includes, for example, a positioning device such as a GPS (Global Positioning System), and an orientation detection device such as a gyro sensor and a geomagnetism sensor. The camera 209 captures an image of a space in a direction faced by the user's head, that is, a space corresponding to the user's field of view.

In this example, the auxiliary storage device 204 stores a program (hereinafter referred to as a "client program") that causes the computer device to function as a client in the remote control system 1. The CPU 201 executes the client program thereby implementing the functions shown in FIG. 2. The CPU 201 executing the client program and the sensor 208 are an example of the requesting unit 22. The communication IF 205 is an example of the receiving unit 23. The display device 207 is an example of the display unit 24. The image-capturing device 209 is an example of the image-capturing unit 25. The input device 206 is an example of the accepting unit 21.

Figure 6:
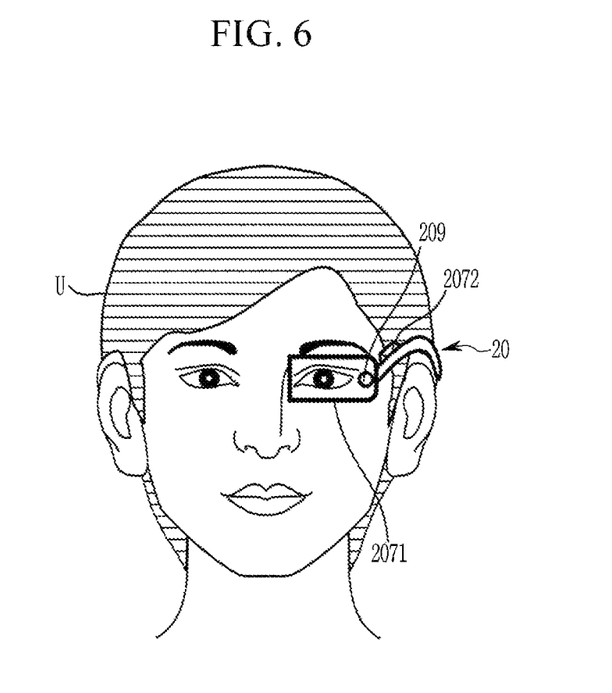
FIG. 6 is a diagram exemplifying an appearance of a user terminal 20.

FIG. 6 is a diagram exemplifying an appearance of the user terminal 20. Here, the user terminal 20 is a glasses-type wearable terminal. The user terminal 20 is worn on a head of a user U, more specifically, in the vicinity of one eye of the user U. The display device 207 includes a display panel 2071 and a projection device 2072. The display panel 2071 is a transmissive panel member that transmits light, and an image projected from the projection device 2072 is projected and displayed on the display panel 2071. The user U can view a space in front of the eye of the user U as transmitted through the display panel 2071, and can also view an image displayed on the display panel 2071. That is, the user U may focus the eye on the space when viewing the space in front of the user's eye, and may focus the eye on a position of the display panel 2071 when viewing the image displayed on the display panel 2071. Further, the display device 207 is not limited to a display device that projects the image from the projection device 2072 on the transmissive display panel 2071, and may be other display device such as a small liquid crystal display provided with a display surface for the eye of the user U. When the user terminal 20 is worn on the face of the user U, the camera 209 is located at a position near the eye of the user U, and captures an image of a space substantially coincident with a field of view of the user U. The image captured by the camera 209 is used by the selecting unit 13 of the server 10 to select the control target device 2.

2. Operation

Figure 7:
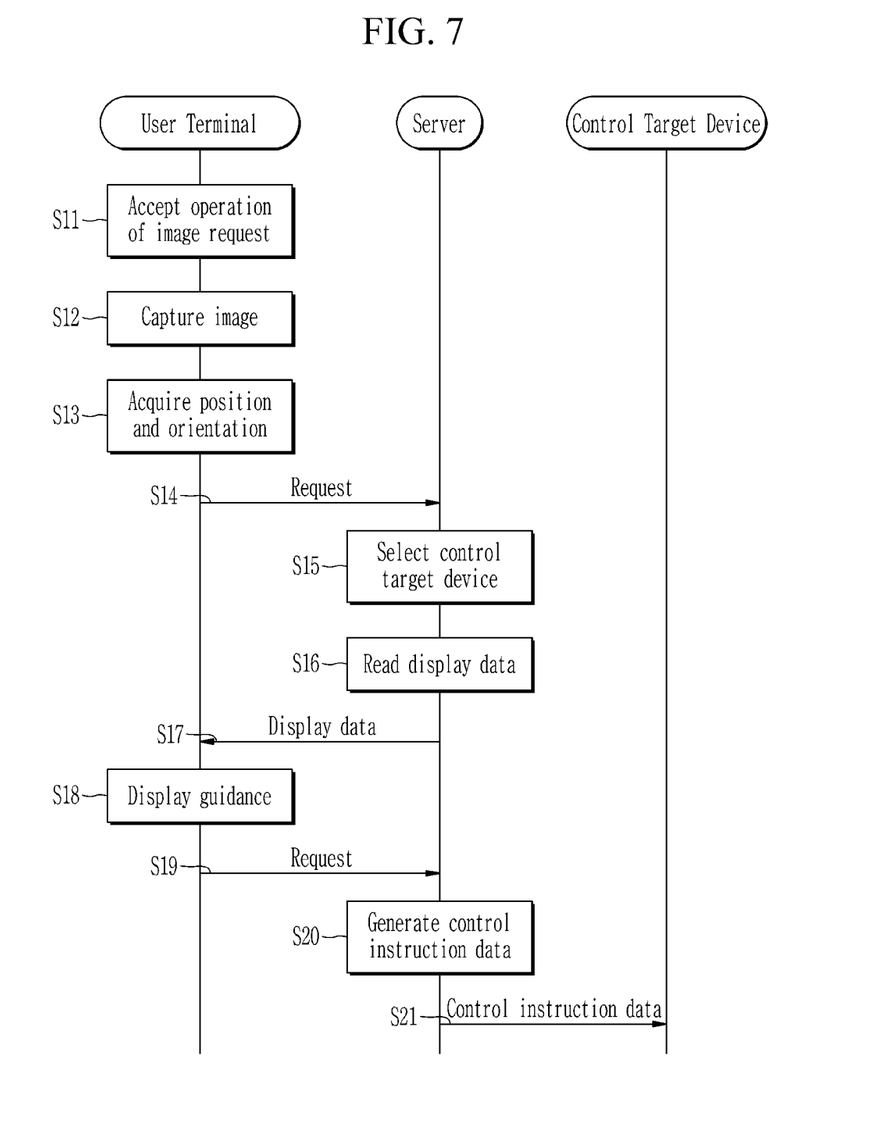
FIG. 7 is a sequence chart exemplifying an operation of a remote control system 1.

FIG. 7 is a sequence chart exemplifying an operation of a remote control system 1 according to an embodiment. In a state where a user terminal 20 is worn on a head, a user sees a control target device 2 which the user wishes to operate. In this state, when the user performs an operation of requesting to perform a remote control of the control target device 2 on an accepting unit 21, the accepting unit 21 of the user terminal 20 accepts this operation in step S11. In step S12, an image-capturing unit 25 captures an image of a space corresponding to the user's field of view and generates captured data. Next, a requesting unit 22 acquires a position and orientation of the user terminal 20 sensed by a sensor 208 in step S13, and transmits a request including the position, the orientation, and the captured data to a server 10 in step S14.

In step S15, upon receiving the request, a selecting unit 13 of the server 10 selects the control target device 2 included in the image captured by the user terminal 20. More specifically, the selecting unit 13 extracts, from the captured data included in the request, an identification image portion in which a two-dimensional barcode attached to the control target device 2 is captured, and decodes the identification image portion to specify a device identifier. In this case, if it is not possible to extract the identification image portion in which the two-dimensional barcode is captured or if the identification image portion cannot be decoded, the selecting unit 13 supplementally selects the control target device 2 as follows. First, the selecting unit 13 determines a range of the space captured by the user terminal 20 based on the position and orientation of the user terminal 20. Next, the selecting unit 13 extracts an image corresponding to the control target device 2 from the image represented by the captured data by an image recognition technique such as pattern matching, and specifies a position of the control target device 2 in the extracted image. The selecting unit 13 then compares the position of the control target device 2 within the range of the captured space with position information of each control target device 2 stored in an auxiliary storage device 104, and selects a control target device 2 whose position matches the specified position within a predetermined error range.

When the control target device 2 is selected in this manner, a control unit 14 reads, from a storage unit 12, display data for performing guidance display of the remote control corresponding to the selected control target device 2 based on the device identifier in step S16, and transmits the display data to the user terminal 20 in step S17.

Figure 8:
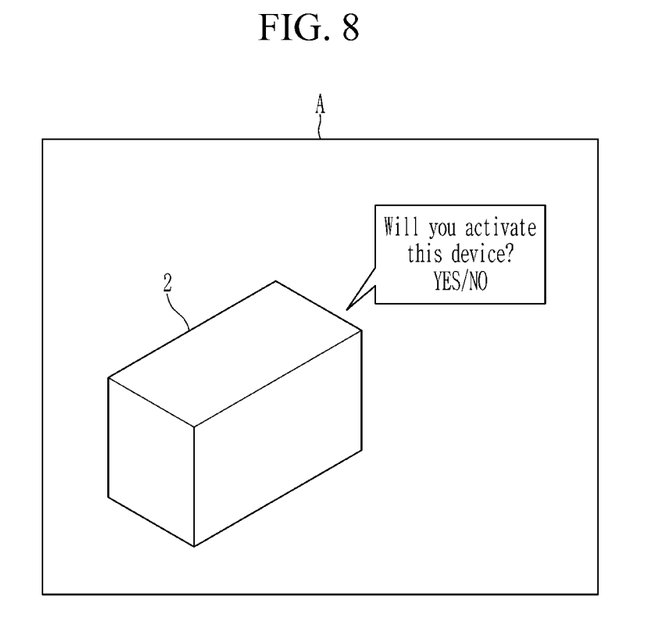
FIG. 8 is a diagram showing an example of superimposing images displayed on a user terminal 20 in a user's field of view.

A display unit 24 of the user terminal 20 displays an image corresponding to the display data received by a receiving unit 23. FIG. 8 is a diagram showing an example of superimposing images displayed on the user terminal 20 in the user's field of view A. As shown in FIG. 8, a remote control menu for the control target device 2 is displayed at a position corresponding to the control target device 2 that is seen through the display panel 2071 by the user. As a result, the user is informed of a specific content of a control on the control target device 2, that is, a content of a process that can be remotely controlled or an instruction method thereof. When the remote control menu is designated by the user, the accepting unit 21 accepts this designation in step S18. Then, in step S19, the requesting unit 22 transmits a request including the content designated by the user to the server 10. Only activation of the control target device has been exemplified as the remote control menu in FIG. 8, but various other remote control menus can be conceivable.

The control unit 15 of the server 10 generates control instruction data for instructing to operate according to the content designated by the user in step S20 and transmits the control instruction data to the control target device 2 in step S21. The control target device 2 operates in accordance with the control instruction data.

According to the present embodiment, it is possible to support selecting the control target device 2 which the user wishes to remotely control, and as a result, the burden on the user is reduced. In addition, the user can remotely control the control target device 2 immediately after selecting the control target device 2.

3. Modified Examples

The present invention is not limited to the above-described embodiments, and various modified examples are possible. Several modified examples are described below. Two or more of the following modified example may be combined for use.

3.1. Modified Example 1

In an embodiment, a selecting unit 13 selects a control target device 2 included in an image captured by a user terminal 20. Here, a method of selecting the control target device 2 is not limited to an example of an embodiment, and can be any one as long as at least one control target devices 2 can be selected from among a plurality of control target devices 2 according to a result obtained by capturing a user's field of view by the user terminal 20.

For example, a two-dimensional barcode indicating a device identifier is attached to a housing of each control target device 2 in an embodiment, but a character string, a figure, or the like indicating the device identifier may be attached without being limited to the two-dimensional barcode.

Further, the device identifier such as the bar code does not need be attached to the control target device 2 itself, but may be attached to a fixed object such as a wall, a floor, or a pillar in the vicinity of the control target device 2. The selecting unit 13 may select a control target device 2 in the vicinity of the fixed object based on a device identifier included in an image captured by the user terminal 20. In sum, the device identifier such as the bar code may be at a position corresponding to each control target device 2.

Furthermore, in a case where shapes, colors, or the like of the control target devices 2 are different and thus each of the control target devices 2 can be identified, the selecting unit 13 may select a control target device 2 included in the user's field of view based on the shape or color of a control target device 2 included in an image captured by the user terminal 20, and the shapes or colors of the control target devices 2 that are stored in a storage unit 12 in advance.

In a case where the control target device 2 can be selected only by the captured image by the user terminal 20, the sensor 208 of the user terminal 20 is not required, but the sensor 208 may be supplementarily used as in an embodiment.

3.2. Modified Example 2

In a case where a plurality of control target devices 2 are included in an image captured by a user terminal 20, the following process may be performed.

For example, when the plurality of control target devices 2 are included in the image captured by the user terminal 20, a selecting unit 13 selects at least one control target device 2 according to a position of each of the control target devices 2 in the image. More specifically, when the plurality of control target devices 2 are included in the image captured by the user terminal 20, for example, a control target device 2 closest to a specific position that is at a center of the image (i.e., a center of the user's field of view) is selected. The specific position may be arbitrarily determined based on criteria other than the center of the image.

3.3. Modified Example 3

Figure 9:
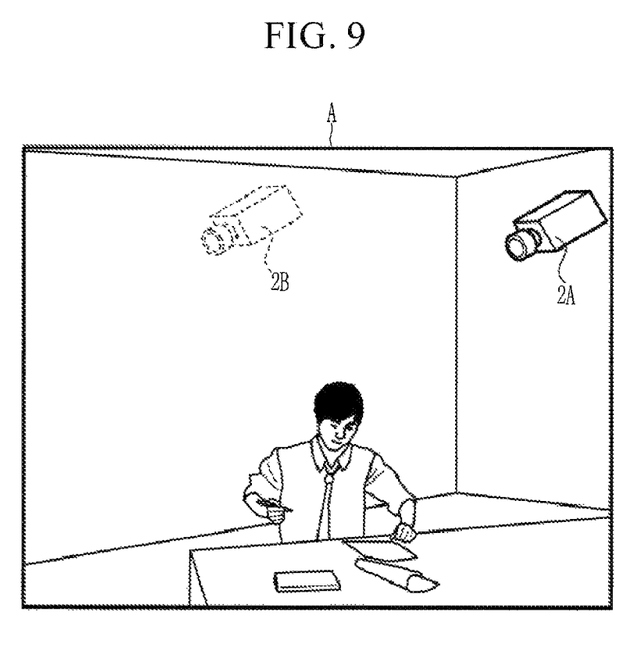
FIG. 9 is a diagram showing an example of superimposing images displayed on a user terminal 20 in a user's field view in a modified example.

A control target device 2, which is in a room different from a room in which a user is present and cannot be directly seen by the user, may be a target of a remote control. In other words, a selecting unit 13 may select a control target device 2 that is not included in an image captured by a user terminal 20 but exists in an image-capturing direction of the user terminal 20. FIG. 9 shows an example in which a control target device 2A (here, a monitoring camera) in a room in which the user is present is visible in the user's field of view A, and a control target device 2B (here, a monitoring camera) in a next room is displayed. In this case, in step S12 of FIG. 7, an image-capturing unit 25 captures an image of a space corresponding to the user's field of view A and generates its captured data. A requesting unit 22 acquires a position and orientation of the user terminal 20 using a sensor 208 in step S13, and transmits a request including the position, the orientation, and the captured data to a server 10 in step S14. In step S15, a selecting unit 13 determines a range of the captured space based on the position and orientation of the user terminal 20 included in the request. Next, the selecting unit 13 extracts a control target device 2 from the image represented by the captured data by an image recognition technology, and specifies a position of the control target device 2 in the image. The selecting unit 13 then compares the position of the control target device 2 within the range of the captured space with position information of each of control target devices 2 stored in an auxiliary storage device 104, and selects a control target device (here, a control target device 2A) whose position matches the specified position within a predetermined error range. Furthermore, the selecting unit 13 selects all the control target devices 2 (here, the control target device 2B in the next room) existing in the image-capturing direction of the user terminal 20, based on the range of the captured space and the position and orientation of the user terminal 20, and specifies a position of the control target device 2B in the image-capturing direction. A providing unit 14 then transmits position information of the selected control target device 2B to the user terminal 20. A display unit 24 of the user terminal 20 displays a broken line image representing the appearance of the control target device 2B at a position where the control target device 2B appears to be present (FIG. 9). For example, when the user designates the control target device 2B in the user terminal 20, the selecting unit 13 selects the designated control target device 2 as a target of a remote control. Furthermore, in a case where a control target device 2 closest to a specific position that is at a center of the image (i.e., a center of the user's field of view) is selected according to the selection criterion, the selecting unit 13 selects the control target device 2B as the target of the remote control.

3.4. Modified Example 4

As described above, a user terminal 20 may be realized by a single device or may be realized by a set of a plurality of devices.

In a case where the user terminal 20 is realized by the single device, for example, a case where the user terminal 20 is a wearable terminal worn on a head of a user, a control unit 14 may remotely control a control target device 2 in accordance with a movement of the head or eye of the user viewing a captured image displayed in the user terminal 20. For example, in a case where the control target device 2 is a monitoring camera, upon wishing to further acquire the lower right side of the captured image of the monitoring camera after the control target device 2 is selected, the user turns the head to the lower right so as to face the side that the user wishes to view. A requesting unit 22 acquires, as information indicating the movement of the user's head, a position and orientation of the user terminal 20 using a sensor 208, and transmits a request including the position, the orientation, and the captured data to a server 10. The control unit 15 of the server 10 drives the control target device 2 according to its position and orientation to move the image-capturing direction of the control target device 2 in the lower right direction as seen from an image center. Thus, the user can intuitively change the captured space of the monitoring camera that is the control target device 2.

In a case where the user terminal 20 is realized by the set of the plurality of devices, for example, a case where the user terminal 20 is realized as a set of a wearable terminal and a mobile terminal such as a smart phone or a tablet, the wearable terminal mainly functions as a terminal that specifies the user's field of view, and the mobile terminal mainly functions as a terminal that accepts a user's operation. In other words, if the user terminal 2 is a wearable terminal worn on the head of the user and an accepting unit 21 is provided in an operation terminal separate from the wearable terminal, the user can perform an operation relating to a remote control using the operation terminal with more satisfactory operation function.

3.5. Modified Example 5

A storage unit 13 may store a history of remote controls of a control target device 2 by a control unit 14. Then, for example, in a factory, it becomes possible to manage work based on a log of remote controls.

3.6. Modified Example 6

A control unit 14 may restrict a control on a control target device 2 based on a predetermined condition. The control unit 14 may permit the remote control only for a user that is present within a predetermined range or in a predetermined direction from the selected control target device 2, for example, based on a positional relationship between a user terminal 20 and the control target device 2. Further, for example, the control unit 14 may prohibit remote controls of a plurality of control target devices 2 for one user terminal 20, and may permit a remote control of only one control target device 2 for one user terminal 20. Furthermore, in a case where a human is present within the predetermined range from the selected control target device 2 and is in danger when the control target device 2 operates, the control unit 14 may prohibit a remote control of the control target device 2. In addition, the control unit 14 may permit a remote control only for a user who has a remote control right that has been permitted for the selected control target device 2 in advance.

3.7. Modified Example 7

In a case where a selecting unit 13 selects one control target device 2 according to results captured by a plurality of user terminals 20 and a remote control conflicts among the plurality of user terminals, a control unit 14 may perform a reservation process that first executes a control according to an instruction by any one of the user terminals 20 (for example, a user terminal 20 that has first issued a remote control instruction) and then executes a control according to an instruction by the other user terminal 20.

3.8. Modified Example 8

A control unit 14 may terminate a remote control on a control target device 2 based on a predetermined condition. For example, the remote control may be terminated in a case of timeout, a timing at which a predetermined number of remote control processes are completed, or termination by an explicit operation by a user.

3.9. Other Modified Example

A control target device 2 is not limited to one exemplified in an embodiment. The control target device 2 needs not be fixed at a specific position but may be a device carried by a user, for example, a smartphone or a digital camera, or may be mounted on a moving object such as a drone.

A positioning device and orientation detection device of a sensor 208 are not limited to the GPS, the gyro sensor and the direction sensor exemplified in an embodiment, but any device may be used as long as it performs the position and orientation detection of the user terminal 20.

A part of the functional configuration exemplified in FIG. 2 may be omitted. For example, a storage unit 12 may be provided by an external server different from the remote control system 1. Further, the functions of the server 10 and user terminal 20 are not limited to those exemplified in FIG. 2. In the embodiment, some of the functions implemented in the server 10 may be implemented in the user terminal 20. Furthermore, a server group that physically consists of a plurality of devices may function as the server 10 in the remote control system 1.

Programs executed by the CPU 101, the CPU 201, and the like may be provided by a storage medium such as an optical disk, a magnetic disk, a semiconductor memory, or the like, or may be downloaded via a communication line such as the Internet. Further, the programs may not execute all the steps described in an embodiment. A set of the server program and the client program is an example of a program group for making the server device and the client terminal function as the remote control system.

What is claimed is:
1. A remote control system comprising:
 a display unit that displays an image representing a camera that is not included in an image captured by a user terminal but exists in an image-capturing direction of the user terminal, at a position in a direction in which the camera exists within a space captured by the user terminal;

a selecting unit that selects the camera that is not included in the image captured by the user terminal but exists in the image-capturing direction of the user terminal when the camera whose image is displayed is designated by a user, wherein the display unit includes a transmissive display panel and displays an image for guiding a control on the selected camera at a position corresponding to the selected camera that is seen through the transmissive display panel by the user; and a control unit that controls the selected camera, wherein the control unit controls a direction of the selected camera in accordance with a movement of a head of the user.

2. The remote control system according to claim 1, wherein the selecting unit further selects the camera included in the image captured by the user terminal.

3. The remote control system according to claim 2, wherein the selecting unit selects the camera based on an identification image of the camera included in an image captured by the user terminal.

4. The remote control system according to claim 2, wherein when a plurality of cameras are included in an image captured by the user terminal, the selecting unit selects at least one camera according to a position of each of the cameras in the image.

5. The display device according to claim 1, further comprising a storage unit that stores a control history of the camera by the control unit.

6. The remote control system according to claim 1, wherein the control unit restricts a control on the selected camera based on a predetermined condition.

7. The remote control system according to claim 2, wherein when the selecting unit selects the one camera according to results captured by a plurality of user terminals and a control by the control unit conflicts among the plurality of user terminals, the control unit performs a reservation process that first executes a control according to an instruction by any one of the user terminals is executed and then executes a control according to an instruction by other user terminal.

8. The remote control system according to claim 1, wherein the control unit terminates a control on the camera based on a predetermined condition.

9. The user terminal according to claim 1, wherein the user terminal is a wearable terminal worn on the head of the user, and the control unit is provided in an operation terminal different from the wearable terminal.

10. A remote control method comprising:

a display step of displaying an image representing a camera that is not included in an image captured by a user terminal but exists in an image-capturing direction of the user terminal, at a position in a direction in which the camera exists within a space captured by the user terminal;

a selecting step of selecting the camera that is not included in the image captured by the user terminal but exists in the image-capturing direction of the user terminal when the camera whose image is displayed is designated by a user;

displaying an image for guiding a control on the selected camera at a position corresponding to the selected camera that is seen through a transmissive display panel by the user; and a control step of controlling the selected camera, wherein the control step includes controlling a direction of the selected camera in accordance with a movement of a head of the user.

11. A program for causing one or more computers to execute:

a display step of displaying an image representing a camera that is not included in an image captured by a user terminal but exists in an image-capturing direction of the user terminal, at a position in a direction in which the camera exists within a space captured by the user terminal;

a selecting step of selecting the camera that is not included in the image captured by the user terminal but exists in the image-capturing direction of the user terminal when the camera whose image is displayed is designated by a user;

displaying an image for guiding a control on the selected camera at a position corresponding to the selected camera that is seen through a transmissive display panel by the user; and a control step of controlling the selected camera, wherein the control step includes controlling a direction of the selected camera in accordance with a movement of a head of the user.

* * * * *